(12) United States Patent
Sidorovich Paradiso et al.

(10) Patent No.: US 11,867,064 B1
(45) Date of Patent: Jan. 9, 2024

(54) SEAL ASSEMBLY FOR AIRCRAFT ENGINE (71) Applicant: PRATT & WHITNEY CANADA CORP., Longueuil (CA)

(72) Inventors: Ivan Sidorovich Paradiso, Toronto (CA); Pouya Mottaghian, Newmarket (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 23 days.

(21) Appl. No.: 17/953,026

(22) Filed: Sep. 26, 2022

(51) Int. Cl.
    *F01D 11/02*      (2006.01)

(52) U.S. Cl.
    CPC ........ *F01D 11/02* (2013.01); *F05D 2220/323* (2013.01)

(58) Field of Classification Search
    CPC ........ F01D 11/02; F01D 11/025; F01D 11/04; F01D 11/06; F05D 2240/55; F05D 2240/56
    See application file for complete search history.

(56) References Cited

U.S. PATENT DOCUMENTS

| | | | |
|---|---|---|---|
| 5,161,943 A * | 11/1992 | Maier | F01D 11/02 277/412 |
| 5,222,742 A * | 6/1993 | Roberts | F01D 11/02 277/423 |
| 5,451,066 A | 9/1995 | Totain | |
| 5,961,279 A | 10/1999 | Ingistov | |
| 9,394,800 B2 * | 7/2016 | Zheng | F01D 11/04 |
| 9,567,908 B2 | 2/2017 | Bordne et al. | |
| 9,638,052 B2 | 5/2017 | Shorney | |
| 11,035,471 B2 * | 6/2021 | Nakaniwa | F16J 15/40 |
| 11,555,410 B2 * | 1/2023 | Pankratov | F01D 11/02 |
| 2022/0145767 A1 * | 5/2022 | Kawashita | F01D 11/02 |

\* cited by examiner

*Primary Examiner* — Kenneth Bomberg
*Assistant Examiner* — Sang K Kim
(74) *Attorney, Agent, or Firm* — NORTON ROSE FULBRIGHT CANADA LLP (57) ABSTRACT

A seal assembly for an aircraft engine includes a first seal having an upstream end exposed to a first pressure area, and a downstream end exposed to a second pressure area, the first seal at least partially defining an intermediate pressure area and a chamber being fluidly connected to the second pressure area and to the intermediate pressure area through passages defined in the first seal, the chamber allowing for a mixing of a first portion of a stream of air with air from the second pressure area, and a second seal connected to the first seal, the second seal biasing the first portion of the stream of air toward the passages, and allowing a second portion of the stream of air from flowing therethrough toward the second pressure area. A method of flowing air through an aircraft seal assembly is also described.

15 Claims, 6 Drawing Sheets

SEAL ASSEMBLY FOR AIRCRAFT ENGINE

TECHNICAL FIELD

The present application relates to seal assemblies for aircraft engines.

BACKGROUND OF THE ART

The present disclosure relates generally to seals for use in an aircraft engine for separating a relatively hot and high-pressure section from a relatively cold and low-pressure section.

In aircraft engines, piston seals are used to separate hot and/or high-pressure sections from the cold and/or low-pressure sections of the engine. For example, piston seals can be provided between a shaft and a disc of the engine.

While prior art seals are suitable for their intended purposes, improvements can be made.

SUMMARY

In one aspect, there is provided a seal assembly for an aircraft engine including a first seal extending in a spacing defined in a radial direction between first and second components of the aircraft engine, the first seal connected to the first component and having an upstream end exposed to a first pressure area, and a downstream end exposed to a second pressure area, the first seal allowing a stream of air from flowing in an axial direction from the upstream end of the first seal into the spacing toward the downstream end of the first seal, the first seal at least partially defining an intermediate pressure area and a chamber for receiving a first portion of the stream of air, the chamber being fluidly connected to the second pressure area and to the intermediate pressure area through passages defined in the first seal upstream of the downstream end of the first seal, the chamber allowing for a mixing of the first portion of the stream of air with air from the second pressure area, and a second seal connected to the first seal, the second seal located in the spacing upstream of the downstream end of the first seal, and downstream of the intermediate pressure area, the second seal biasing the first portion of the stream of air toward the passages, and allowing a second portion of the stream of air from flowing through the second seal toward the second pressure area.

In some embodiments, the first pressure area is a higher pressure area, the second pressure area is a lower pressure area, and the intermediate pressure area has a pressure intermediate the first and second pressure areas.

In some embodiments, the second portion of the stream of air flows through the second seal, through the downstream end of the first seal and to the second pressure area.

In some embodiments, the seal assembly provides for axial and radial displacements between first and second components.

In some embodiments, the first seal is formed as a labyrinth seal having a plurality of fins, and each fin of the plurality of fins is pointing towards the second component.

In some embodiments, the second seal includes at least one of a rope seal and a brush seal, and the second seal is located between adjacent fins of the plurality of fins.

In some embodiments, each fin of the plurality of fins is inclined toward the upstream end of the first seal.

In some embodiments, the passages are angled relative to the radial direction in a plane orthogonal to the axial direction.

In some embodiments, each one of the passages defines a passage axis, and the passage axes are located on a same radially extending plane.

In some embodiments, the seal assembly further includes a radially extending protrusion connected to the downstream end of the first seal.

In some embodiments, the protrusion extends between the chamber and a discharge channel defined between the first and second components.

In some embodiments, the first seal, the second seal, the first component and the second component are rotatable at a same speed.

In some embodiments, the first portion of the stream of air flowing out of the passages has a speed that is different from the speed of the first seal, the second seal, the first component and the second component.

In some embodiments, the first component is a disc in a compressor section of the aircraft engine.

In some embodiments, the second component is a shaft extending at least partially in a compressor section of the aircraft engine.

In another aspect, there is provided a method of flowing air through an aircraft seal assembly, including receiving a stream of air from a higher pressure area at an upstream end of a first seal of the aircraft seal assembly, biasing a first portion of the stream of air flowing through the first seal toward a chamber through passages defined in the first seal, mixing in the chamber the first portion of the stream of air with air from a lower pressure area, and flowing a second portion of the stream of air through a second seal connected to the first seal and located downstream of the passages, and on to the lower pressure area.

In some embodiments, the biasing of the first portion of the stream of air toward the chamber includes changing a speed of the first portion of the stream of air.

In some embodiments, the biasing of the first portion of the stream of air toward the chamber includes imparting motion to the first portion of the stream of air in at least one of a circumferential direction, a radial direction and an axial direction.

In some embodiments, the mixing the first portion of the stream of air with air from the lower pressure area includes swirling the first portion of the stream of air with air from the lower pressure area.

In some embodiments, the method further includes evacuating the first portion of the stream of air to the lower pressure area through a discharge channel defined at least partially by a protrusion connected to the first seal.

DESCRIPTION OF THE DRAWINGS

Reference is now made to the accompanying figures in which.

DETAILED DESCRIPTION

Figure 1:
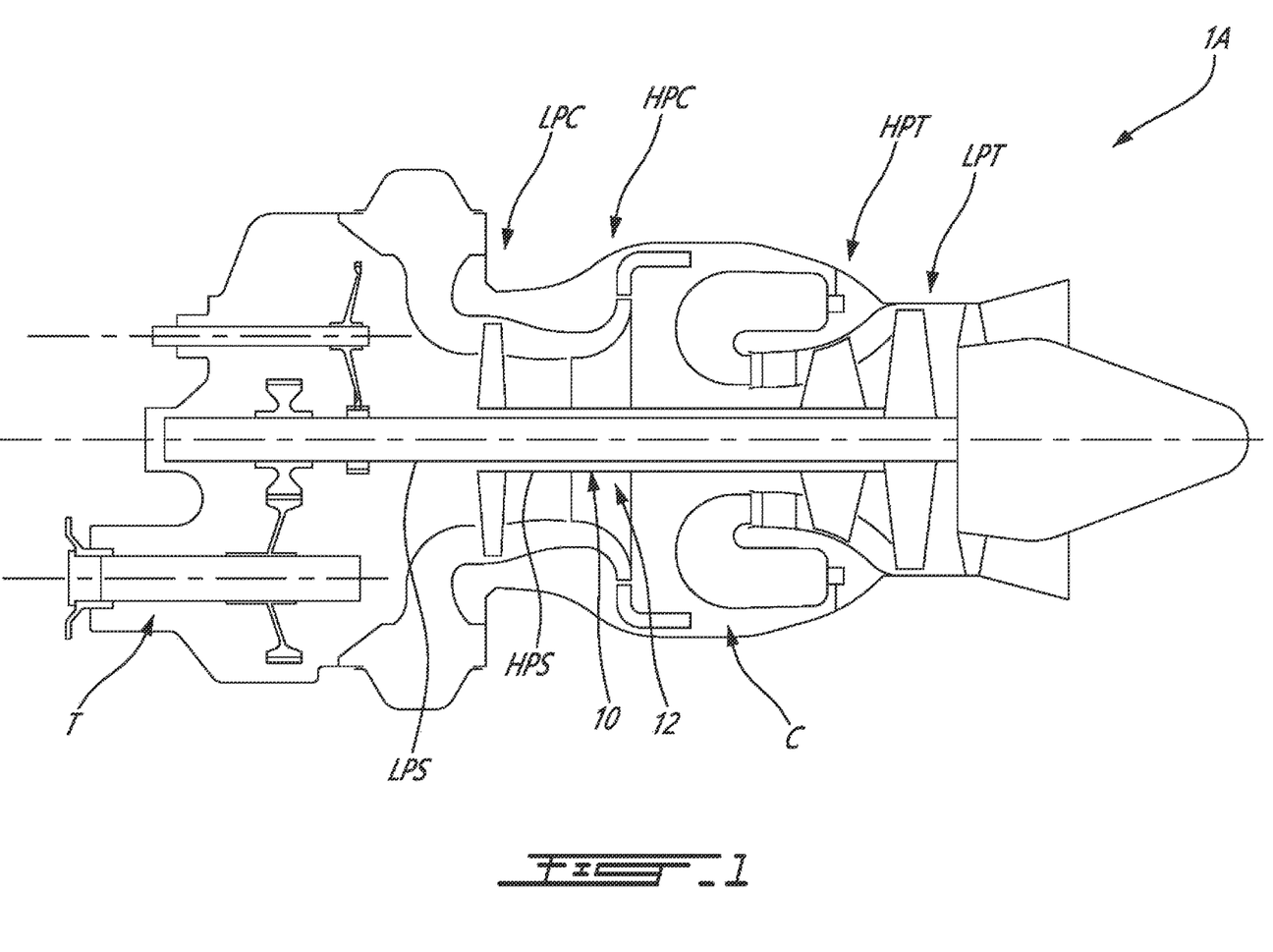
FIG. 1 is a schematic cross sectional view of an aircraft engine.

FIG. 1 illustrates an aircraft engine 1A, which may be part of an aircraft. In this example, the engine 1A is a turboshaft engine 1A, but could be any other type of aircraft engine. In this embodiment, the engine 1A includes in serial flow communication a low pressure compressor section (LPC) and a high pressure compressor section (HPC) for pressurizing air, a combustor (C) in which the compressed air is mixed with fuel and ignited for generating an annular stream of hot combustion gases, a high pressure turbine section (HPT), and a lower pressure turbine section (LPT). The respective pairs of the compressor and turbine sections are interconnected via respective independently rotatable low pressure and high pressure spools (LPS), (HPS). The engine 1A includes a transmission (T) driven by the low pressure turbine section (LPT) for outputting motive power to an aircraft. The engine 1A may include a high pressure shaft 10 to which high pressure turbine section (HPT) and high pressure compressor (HPC) are drivingly coupled thereto. The high-pressure compressor (HPC) may include a plurality of compressor discs 12 connected to the high pressure shaft 10.

Figure 2:
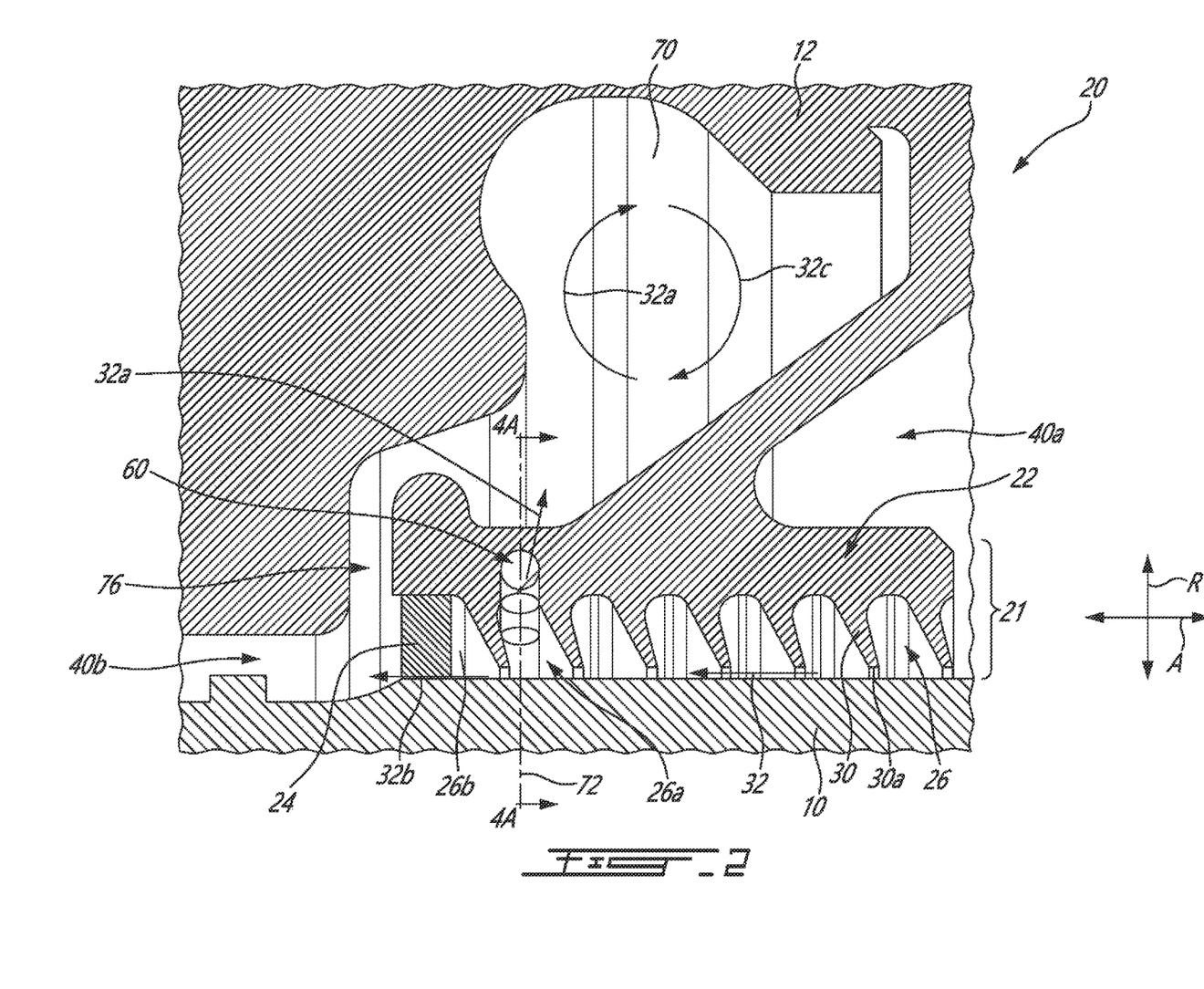
FIG. 2 is a cross sectional view of a seal assembly for an aircraft engine.

Referring to FIG. 2, a seal assembly 20 is located in a spacing 21 defined in a radial direction R between each compressor disc 12 and the high pressure shaft 10. The seal assembly 20 rotates at a same speed that the compressor disc 12 and the high pressure shaft 10. It is contemplated that the seal assembly 20 could rotate at a different speed than that of the compressor disc 12 and the high pressure shaft 10 in other embodiments. The seal assembly 20 allows for unconstrained axial (i.e. along axial direction A) and radial displacements (i.e. along radial direction R) between the high pressure shaft 10 and the compressor disc 12. Although herein described in relation with the high pressure shaft 10 and one of the compressor discs 12, it is contemplated that the seal assembly 20 could be used at different locations of an aircraft engine, notably between adjacent areas causing relatively high thermal and pressure gradients.

The seal assembly 20 includes a seal 22 formed as a labyrinth seal, and a seal 24 (schematically represented in FIG. 2) connected to the labyrinth seal 22. The labyrinth seal 22 is connected to the compressor disc 12. In the present embodiment, the labyrinth seal 22 is integrally formed with the compressor disc 12, but the labyrinth seal 22 and the compressor disc 12 could be provided as separate components, and connected together using suitable techniques in other embodiments. The labyrinth seal 22 is characterized by a number of grooves 26 (i.e. the labyrinth) divided by a plurality of fins 30. Each fin 30 has a sharp crest 30a pointing towards the high pressure shaft 10 and providing the required seal between the high pressure shaft 10 and the compressor disc 12. The seal 24 is connected to the labyrinth seal 22 between adjacent fins 30 of the plurality of fins 30, and will be described in detail below.

The principle of operation is that a controlled stream 32 of air is allowed to flow through the labyrinth seal 22 in the axial direction A driven by a differential pressure between pressure area 40a and pressure area 40b. Put differently, the pressure areas 40a, 40b are separated from one another by the high pressure shaft 10, the compressor disc 12 and the seal assembly 20. The pressure area 40a is at a higher pressure than the pressure area 40b. The pressure area 40a is also at a temperature higher than the temperature of the pressure area 40b.

In the present description, relative terms "upstream" and "downstream" are used with reference to the flow of the stream 32 of air flowing through the seal assembly 20 from the pressure area 40a to the pressure area 40b. Furthermore, the higher, intermediate and lower pressure areas referred to in the following description are used in a relative sense. Hence, the high and intermediate pressure areas are at a higher pressure than the lower pressure area, and there is an expected dominating flow from the relative higher pressure area 40a to the intermediate pressure area and the lower pressure area 40b.

At each crest 30a of the labyrinth seal 22, the stream 32 of air is forced to separate, thereby losing part of its kinetic energy and pressure. The separated stream 32 of air is temporarily trapped in one of the grooves 26 before entering the next groove 26 of the labyrinth seal 22, where the process of separation and disturbance is repeated.

Figure 3:
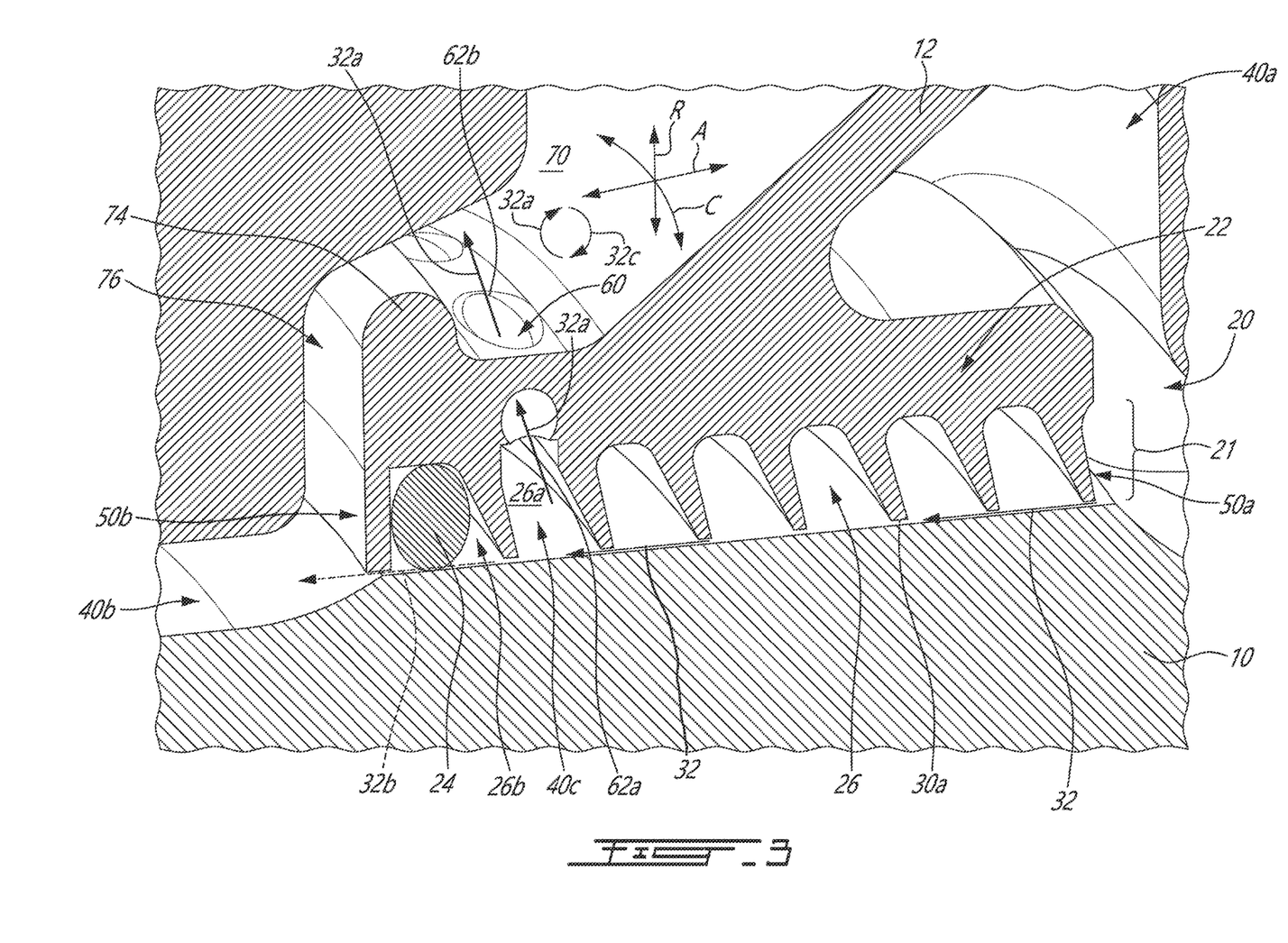
FIG. 3 is a perspective, cross sectional view of the seal assembly of FIG. 2.

Referring to FIGS. 2 and 3, the labyrinth seal 22 has an upstream end 50a (FIG. 3) exposed to the pressure area 40a, and a downstream end 50b (FIG. 3) exposed to the pressure area 40b. Each fin 30 of the plurality of fins 30 is inclined toward the upstream end 50a of the labyrinth seal 22. Such an arrangement of the plurality of fins 30 assists in the separation and disturbance processes of the stream 32 of air described above, but the fins 30 could be oriented and shaped otherwise in other embodiments. For example, the fins 30 could be not tapered as in the present embodiment. As the stream 32 of air flows towards the downstream end 50b, the stream 32 of air enters groove 26a. In the groove 26a, the stream 32 of air has an intermediate pressure, and an intermediate temperature. The groove 26a and the portion of the high pressure shaft 10 facing the groove 26a define an intermediate pressure area 40c (FIG. 3).

Figure 5A:
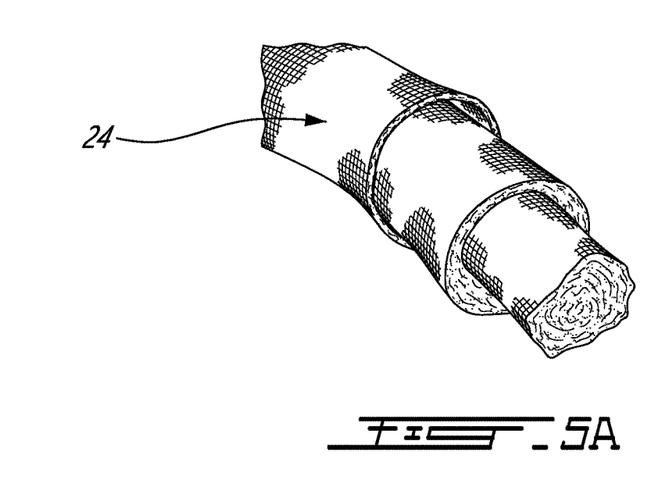
FIG. 5A is a perspective view of a rope seal.
Figure 5B:
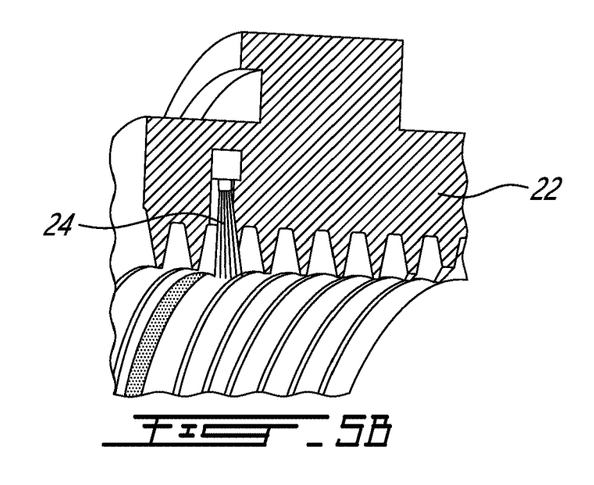
FIG. 5B is a perspective view of a brush seal connected to a labyrinth seal.

Still referring to FIGS. 2 and 3, the seal 24 is located in the spacing 21 and extends in the radial direction R between the labyrinth seal 22 and the high pressure shaft 10. More particularly, the seal 24 is located in groove 26b that is closest to the downstream end 50b of the labyrinth seal 22. It is contemplated that the seal 24 could be located in another groove 26 of the labyrinth seal 22 in other embodiments, such as the penultimate groove 26 before the downstream end 50b of the labyrinth seal 22, or in another upstream groove 26. The groove 26a is located upstream of the seal 24, and upstream of the groove 26b. The seal 24 extends downstream of the intermediate pressure area 40c. The seal 24 illustrated in FIG. 3 is a rope seal, and is shown in isolation in FIG. 5A. It is contemplated that the seal 24 could differ in different embodiments, and that it could be, as an example, a brush seal (as shown in FIG. 5B) in other embodiments. It is also contemplated that the seal 24 could include a rope seal and a brush seal in some embodiments. The seal 24 provides an additional restriction to the stream 32 of air flowing in the axial direction A toward the downstream end 50b of the labyrinth seal 22. As will be described below, the seal 24 allows for a portion of the stream 32 of air to flow therethrough and toward the downstream end 50b of the labyrinth seal 22. In other embodiments, more than one seal 24 could be connected to the labyrinth seal 22, and could be provided in one or more of the grooves 26.

Passages 60 (FIG. 3) are defined in the labyrinth seal 22 upstream of the downstream end 50b thereof. The seal 24 is downstream of the passages 60. The passages 60 fluidly connect the groove 26a defining the intermediate pressure area 40c to a chamber 70 defined partially by the labyrinth seal 22 and located radially outward (i.e. away from the high pressure shaft 10) of the intermediate pressure area 40c. Put differently, an inner end 62a (FIG. 4A) (i.e. the end that is closer to the high pressure shaft 10) of each passage 60 is fluidly connected to the intermediate pressure area 40c, and an outer end 62b (FIG. 4A) of each passage 60 (i.e. the end that is further away from the high pressure shaft 10) is fluidly connected to the chamber 70. The chamber 70 is also fluidly connected to the lower pressure area 40b. The chamber 70 receives air from the intermediate pressure area 40c and allows mixing thereof with air from the lower pressure area 40b. A discharge channel 76 (FIGS. 2 and 3) fluidly connects the chamber 70 to the lower pressure area 40b. The discharge channel 76 is defined between the high pressure shaft 10 and the compressor disc 12. A protrusion 74 is connected to the downstream end 50b of the labyrinth seal 22, and extends radially in the chamber 70. The protrusion 74 is integrally formed with the labyrinth seal 22 at the downstream end 50b thereof, but the protrusion 74 and the labyrinth seal 22 could be provided as a separate components connected together in other embodiments. The protrusion 74 assists in promoting the mixing of air in the chamber 70 by lengthening the path for the portion of the stream 32 of air flowing through the passages 60, into the chamber 70 and to the discharge channel 76.

Figure 4A:
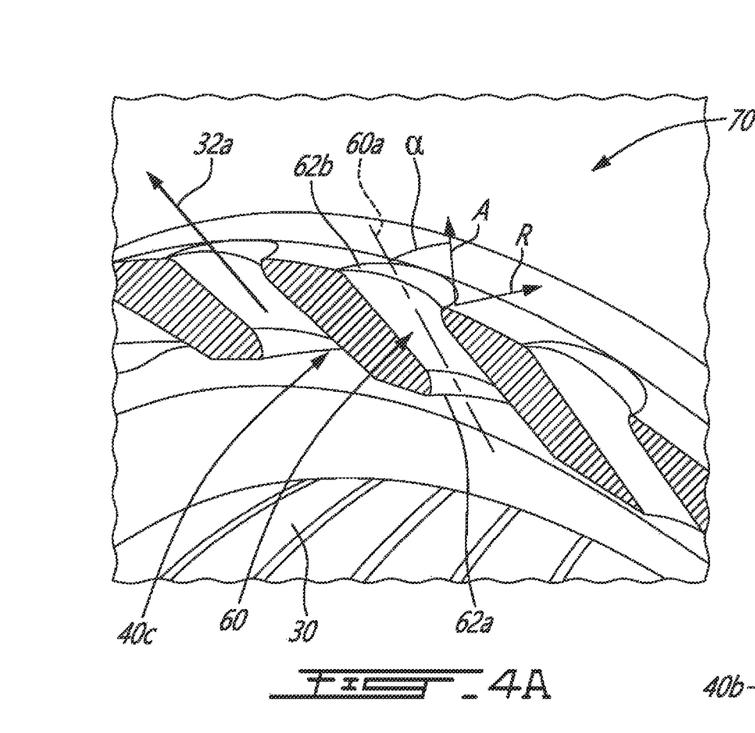
FIG. 4A is a perspective, cross sectional view of the seal assembly of FIG. 2 taken along cross section line 4A-4A of FIG. 2.
Figure 4B:
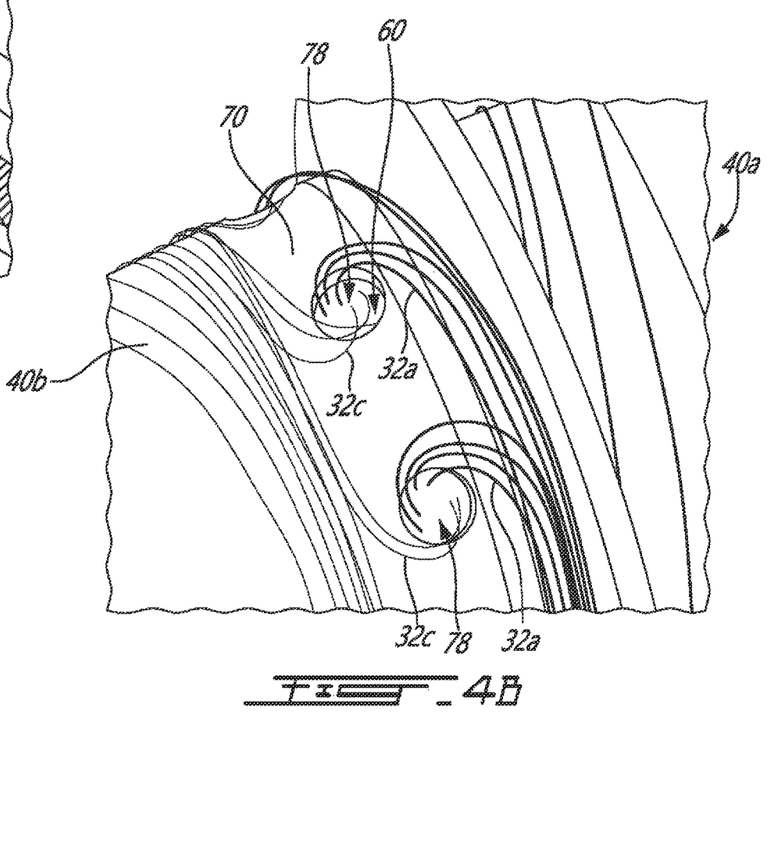
FIG. 4B is a perspective view of the seal assembly of FIG. 2.

Referring to FIGS. 3 to 4B, the passages 60 are angled relative to the radial direction R in a plane 72 (FIG. 2) that is orthogonal to the axial direction A. Referring to FIG. 4A, each passage 60 defines a passage axis 60a that is skewed relative to the radial direction R in the plane 72 by angle α. In addition, each one of the passage axes 60a is contained in the plane 72. It is contemplated that the passages 60 could also be defined so as to have the inner ends 62a and the outer ends 62b offset along the axial direction A, and thus the passage axes 60a would be contained in different planes. The passages 60 could also be defined such that the passage axes 60a are contained on two or more planes extending in the radial direction R. The passages 60 could also have an elliptical shape or another suitable shape. Different shapes and configurations of the passages 60 are thus contemplated.

Still referring to FIGS. 3 to 4B, the different flow paths for the stream 32 of air will now be described. As described above, the stream 32 of air enters the labyrinth seal 22 at the upstream end 50a thereof, and flows along the axial direction A in the spacing 21 toward the downstream end 50b of the labyrinth seal 22. As the stream 32 of air enters groove 26a, a portion 32a of the stream 32 of air present in the intermediate pressure area 40c is drawn to flow toward the passages 60, and another portion 32b of the stream 32 of air present in the intermediate pressure area 40c is drawn to flow through the seal 24. In the present embodiment, the portion 32a is greater than the portion 32b as the portion 32a represents a majority of the air composing the stream 32 of air, but this could differ in other embodiments. Because of the seal provided by the seal 24, the portion 32a of the stream 32 of air present in the intermediate pressure area 40c is biased toward the passages 60 in order to flow through the passages 60 and to the chamber 70. The seal 24 provides enough backpressure to ensure a circumferential flow distribution of the portion 32a of the stream 32 of air in the chamber 70. In addition, the seal 24 provides a means to diffuse the portion 32b of the stream 32 of air flowing in the axial direction A, and may assist in further reducing a jet effect from the portion 32b while allowing the portion 32b of the stream 32 of air to flow through the downstream end 50b of the labyrinth seal 22 and to the lower pressure area 40b. In other words, the velocity of the portion 32b of the stream 32 of air flowing in the axial direction A is reduced when flowing through the seal 24.

The chamber 70 receives the portion 32a of the stream 32 of air. As the portion 32a of the stream 32 of air flows through the passages 60, the portion 32a of the stream 32 of air exiting the passages 60 swirls with air of the lower pressure area 40b. The swirl is induced by the angle of the passages 60 relative to the radial direction R, and because air flowing through the passages 60 is imparted with a motion in a circumferential direction C orthogonal to the axial direction A and radial direction R (FIG. 3). As the portion 32a of the stream 32 of air flows through the passages 60, it changes speed relative to the air present in the intermediate pressure area 40c, and in the lower pressure area 40b. The portion 32a of the stream 32 of air exiting the passages 60 also has a speed that is different from the speed of the labyrinth seal 22, seal 24, high pressure shaft 10 and compressor disc 12 since they are rotating at a same speed. The swirl causes the portion 32a of the stream 32 of air to consistently mix with air of the lower pressure area 40b. As best shown in FIG. 4B, each passage 60 causes the formation of a vortex 78 mixing air from the portion 32a of the stream 32 of air with air 32c of the lower pressure area 40b having lower pressure and lower temperature than that of the air from the portion 32a of the stream 32 of air. The mixing of the portion 32a of the stream of air with air 32c is also promoted by the chamber 70 and protrusion 74. During mixing, there is a thermal exchange from the portion 32a of the stream 32 of air to air 32c. Put differently, as the portion 32a of the stream 32 of air is whirling with air 32c, there is an enhanced mixing and thermal exchange therebetween. After having been consistently mixed, the portion 32a of the stream 32 of air is evacuated through the discharge channel 76 due to the pressure differential between the intermediate pressure area 40c and the lower pressure area 40b. Because of the mixing occurring in the chamber 70, the solids defining the chamber 70 (i.e. the labyrinth seal 22 and the compressor disc 12) have a thermal gradient that is more evenly distributed therein, which may reduce at least in some circumstances wear and/or undesirable vibrations induced in the high pressure shaft 10 and compressor disc 12.

After evacuation through the discharge channel 76, the portion 32a of the stream 32 of air meets with the portion 32b of the stream 32 of air downstream of the downstream end 50b of the labyrinth seal 22, and compose at least some of the air defining the lower pressure area 40b.

Figure 6:
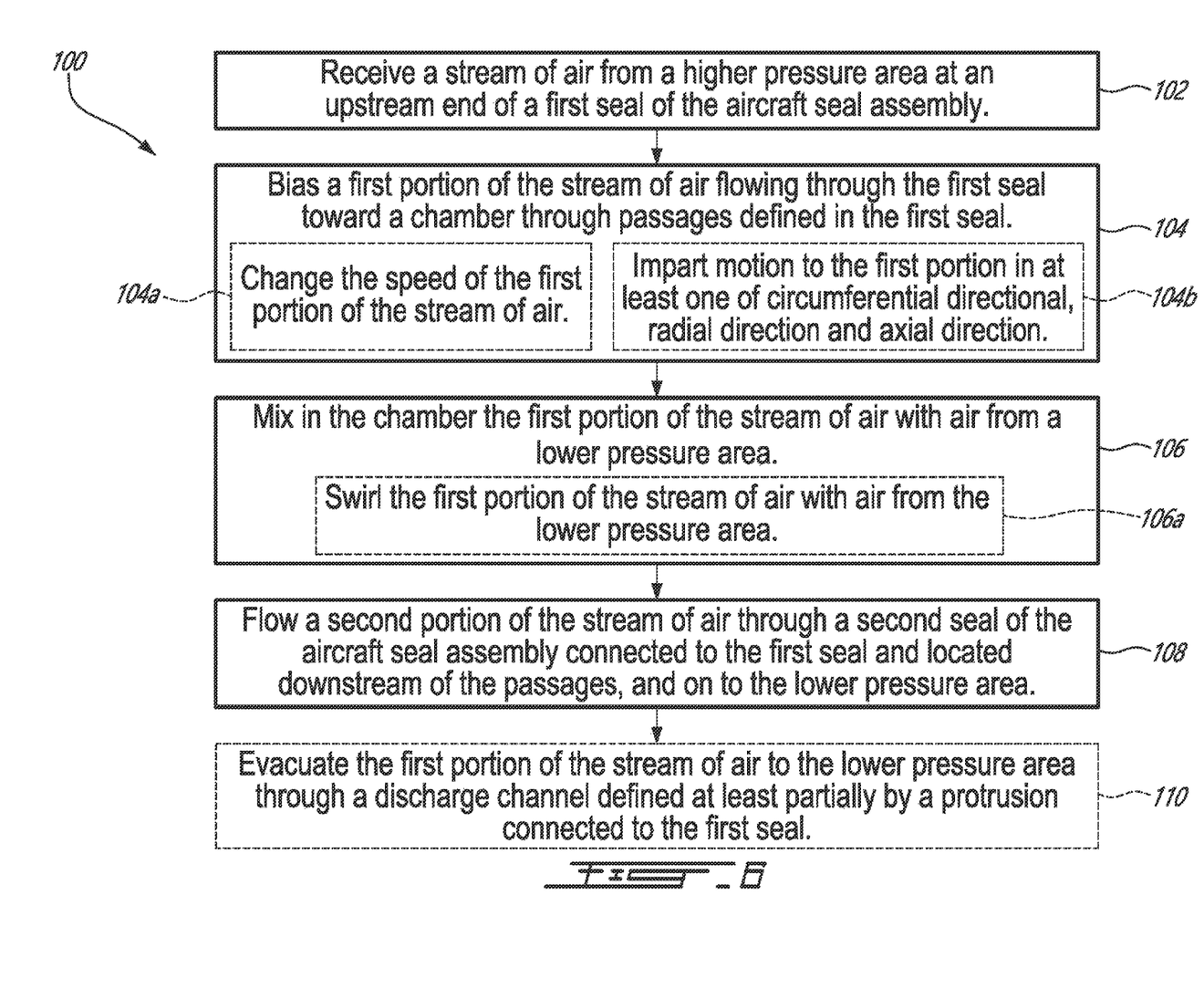
FIG. 6 is a diagram showing a method for flowing air through an aircraft seal assembly.

With the above-described structures and features in mind and with reference to FIG. 6, a method 100 of flowing air through the aircraft seal assembly 20 will be described. At step 102, the method 100 includes receiving the stream 32 of air from the higher pressure area 40a at the upstream end 50a of the labyrinth seal 22. The method 100 further includes, at step 104, biasing the portion 32a of the stream 32 of air toward the chamber 70 through the passages 60 defined in the labyrinth seal 22. The biasing step 104 may include step 104a (shown in dotted line box) of changing the speed of the portion 32a of the stream 32 of air relative to the air present in the lower pressure area 40b, the intermediate pressure area 40c or the chamber 70. The biasing step 104 may also include step 104b (shown in dotted line box) of imparting motion to the portion 32a of the stream 32 of air in the circumferential direction C and/or in the radial direction R and/or in the axial direction A. Step 106 involves mixing the portion 32a of the stream 32 of air with air from the lower pressure area 40b in the chamber 70. The mixing step 106 may involve step 106a (shown in dotted line box) of swirling the portion 32a of the stream 32 of air with air from the lower pressure area 40b to enhance mixing and thermal exchange therebetween. At step 108, the method 100 includes flowing the portion 32b of the stream 32 of air through the seal 24, and on to the lower pressure area 40b. The method 100 may further include step 110 (shown in dotted line box) of evacuating the portion 32a of the stream 32 of air to the lower pressure area 40b through the discharge channel 76 defined at least partially by the protrusion 74 connected to the labyrinth seal 22.

The above description is meant to be exemplary only, and one skilled in the art will recognize that changes may be made to the embodiments described without departing from the scope of the technology disclosed herein. Still other modifications which fall within the scope of the present technology will be apparent to those skilled in the art, in light of a review of this disclosure, and such modifications are intended to fall within the appended claims.

The invention claimed is:

1. A seal assembly for an aircraft engine, comprising:
a first seal extending in a spacing defined in a radial direction between first and second components of the aircraft engine, the first seal connected to the first component and having an upstream end exposed to a first pressure area, and a downstream end exposed to a second pressure area, the first seal allowing a stream of air from flowing in an axial direction from the upstream end of the first seal into the spacing toward the downstream end of the first seal, the first seal at least partially defining an intermediate pressure area and a chamber for receiving a first portion of the stream of air, the chamber being fluidly connected to the second pressure area and to the intermediate pressure area through passages defined in the first seal upstream of the downstream end of the first seal, the chamber allowing for a mixing of the first portion of the stream of air with air from the second pressure area; and
a second seal connected to the first seal, the second seal located in the spacing upstream of the downstream end of the first seal, and downstream of the intermediate pressure area, the second seal biasing the first portion of the stream of air toward the passages, and allowing a second portion of the stream of air from flowing through the second seal toward the second pressure area.

2. The seal assembly of claim 1, wherein the first pressure area is a higher pressure area, the second pressure area is a lower pressure area, and the intermediate pressure area has a pressure intermediate the first and second pressure areas.

3. The seal assembly of claim 2, wherein the second portion of the stream of air flows through the second seal, through the downstream end of the first seal and to the second pressure area.

4. The seal assembly of claim 1, wherein the seal assembly provides for axial and radial displacements between first and second components.

5. The seal assembly of claim 1, wherein the first seal is formed as a labyrinth seal having a plurality of fins, and each fin of the plurality of fins is pointing towards the second component.

6. The seal assembly of claim 5, wherein the second seal includes at least one of a rope seal and a brush seal, and the second seal is located between adjacent fins of the plurality of fins.

7. The seal assembly of claim 5, wherein each fin of the plurality of fins is inclined toward the upstream end of the first seal.

8. The seal assembly of claim 1, wherein the passages are angled relative to the radial direction in a plane orthogonal to the axial direction.

9. The seal assembly of claim 1, wherein each one of the passages defines a passage axis, and the passage axes are located on a same radially extending plane.

10. The seal assembly of claim 1, further comprising a radially extending protrusion connected to the downstream end of the first seal.

11. The seal assembly of claim 10, wherein the protrusion extends between the chamber and a discharge channel defined between the first and second components.

12. The seal assembly of claim 1, wherein the first seal, the second seal, the first component and the second component are rotatable at a same speed.

13. The seal assembly of claim 12, wherein the first portion of the stream of air flowing out of the passages has a speed that is different from the speed of the first seal, the second seal, the first component and the second component.

14. The seal assembly of claim 1, wherein the first component is a disc in a compressor section of the aircraft engine.

15. The seal assembly of claim 1, wherein the second component is a shaft extending at least partially in a compressor section of the aircraft engine.

* * * * *